United States Patent
Takagi et al.

(10) Patent No.: US 10,435,530 B2
(45) Date of Patent: Oct. 8, 2019

(54) CROSSLINKED EXPANDED BEADS AND MOLDED EXPANDED-BEAD OBJECT

(71) Applicant: JSP Corporation, Tokyo (JP)

(72) Inventors: Shota Takagi, Yokkaichi (JP); Masaharu Oikawa, Yokkaichi (JP)

(73) Assignee: JSP Corporation, Tokyo (JP)

( * ) Notice: Subject to any disclaimer, the term of this patent is extended or adjusted under 35 U.S.C. 154(b) by 0 days.

(21) Appl. No.: 15/572,873

(22) PCT Filed: Mar. 28, 2016

(86) PCT No.: PCT/JP2016/059961
§ 371 (c)(1),
(2) Date: Nov. 9, 2017

(87) PCT Pub. No.: WO2016/181714
PCT Pub. Date: Nov. 17, 2016

(65) Prior Publication Data
US 2018/0127559 A1 May 10, 2018

(30) Foreign Application Priority Data

May 14, 2015 (JP) .................................. 2015-098983

(51) Int. Cl.
| | | |
|---|---|---|
| *C08F 297/08* | (2006.01) | |
| *C08J 9/18* | (2006.01) | |
| *C08J 9/224* | (2006.01) | |
| *C08J 9/228* | (2006.01) | |
| *C08J 9/12* | (2006.01) | |
| *C08J 9/232* | (2006.01) | |
| *C08F 210/16* | (2006.01) | |
| *C08L 53/00* | (2006.01) | |

(52) U.S. Cl.
CPC ............. *C08J 9/18* (2013.01); *C08F 297/086* (2013.01); *C08J 9/122* (2013.01); *C08J 9/224* (2013.01); *C08J 9/228* (2013.01); *C08J 9/232* (2013.01); *C08F 210/16* (2013.01); *C08J 2201/026* (2013.01); *C08J 2203/06* (2013.01); *C08J 2205/06* (2013.01); *C08J 2207/00* (2013.01); *C08J 2323/08* (2013.01); *C08J 2353/00* (2013.01); *C08L 53/00* (2013.01)

(58) Field of Classification Search
CPC .............. C08F 297/00; C08F 297/0086; C08F 210/16; C08J 9/18; C08J 9/224; C08J 9/28; C08J 9/232; C08J 2201/026; C08J 2203/06; C08J 2205/06; C08J 2207/00; C08J 2323/08; C08J 2353/00; C08L 53/00
See application file for complete search history.

(56) References Cited

U.S. PATENT DOCUMENTS

2008/0194573 A1    8/2008  Feuerbach et al.

FOREIGN PATENT DOCUMENTS

| JP | S51-124157 A | 10/1976 |
|---|---|---|
| JP | H05-009329 A | 1/1993 |
| JP | 2003-147116 A | 5/2003 |
| JP | 2008-533289 A | 8/2008 |
| JP | 2011-132356 A | 7/2011 |
| JP | 2011-184574 A | 9/2011 |
| JP | 51-22951 B2 | 1/2013 |
| JP | 2013-064137 A | 4/2013 |

OTHER PUBLICATIONS

JP2011-184574 machine translation downloaded Dec. 18, 2018.*
JP05-009329 machine translation downloaded Dec. 18, 2018.*
International Search Report for PCT/JP2016/059961 dated Jun. 28, 2016; English translation submitted herewith (5 pages).

* cited by examiner

*Primary Examiner* — Irina S Zemel
*Assistant Examiner* — Jeffrey S Lenihan
(74) *Attorney, Agent, or Firm* — Fitch, Even, Tabin & Flannery LLP

(57) ABSTRACT

An object of the present invention is to provide expanded beads capable of producing an expanded beads molded article that is excellent in in-mold moldability and is excellent with good balance in lightweight property, flexibility, repulsion, restorability, and tensile characteristics, and an expanded beads molded article using the expanded beads. The expanded beads molded article of the present invention is produced by subjecting the crosslinked expanded beads of the present invention, to in-mold molding. The expanded beads molded article of the present invention may have an apparent density of from 40 to 150 g/L.

3 Claims, No Drawings

CROSSLINKED EXPANDED BEADS AND MOLDED EXPANDED-BEAD OBJECT

CROSS-REFERENCE TO RELATED APPLICATIONS

This application is a U.S. national phase application filed under 35 U.S.C. § 371 of International Application PCT/JP2016/059961, filed on Mar. 28, 2016, designating the United States, which claims priority from Japanese Application Number 2015-098983, filed May 14, 2015.

FIELD OF THE INVENTION

The present invention relates to crosslinked expanded beads containing an ethylene-α-olefin multi-block copolymer, and an expanded beads molded article thereof.

BACKGROUND OF THE INVENTION

Polyolefin resin expanded beads can be molded into various shapes depending on purposes thereof. A polyolefin expanded beads molded article obtained from the expanded beads through in-mold molding is applied to a wide range of purposes including various kinds of a packaging or cushioning material, a shock absorber for automobiles, a building material, and the like. However, in the case where the known polyolefin resin expanded beads molded article is applied to purposes including a seat cushioning material, a pad material for sporting, a shoe sole material, and the like, the polyolefin resin expanded beads molded article may be insufficient in repulsion, flexibility, and restorability, in some cases. In the case where the polyolefin resin expanded beads molded article is applied to purposes including a seat cushioning material, a pad material for sporting, a shoe sole material, and the like, furthermore, the molded article is preferably improved in tensile characteristics. Accordingly, there has been a demand of novel expanded beads suitable for the purposes capable of replacing the polyolefin resin expanded beads. As the expanded beads excellent in flexibility, for example, an expanded article containing a polyolefin resin and an elastomer (see, for example, PTLs 1 and 2) and an expanded article containing an ethylene-α-olefin multi-block copolymer (see, for example, PTL 3) have been known as ordinary techniques.

CITATION LIST

Patent Literatures

PTL 1: JP-A-2003-147116
PTL 2: JP-A-2011-132356
PTL 3: JP-A-2013-64137

SUMMARY OF INVENTION

However, in the case where the expanded beads molded article produced with the expanded beads described in PTL 1 is applied to purposes including a seat cushioning material, a pad material for sporting, a shoe sole material, and the like, the molded article may be insufficient in lightweight property in some cases. The expanded beads molded article produced with the expanded beads described in PTL 2 is excellent in lightweight property, but is necessarily further enhanced in flexibility, tensile characteristics, and restorability, in the application to the aforementioned purposes. PTL 3 describes expanded beads, but does not consider sufficiently an expanded beads molded article obtained through in-mold molding of the expanded beads. Under the circumstances, an object of the present invention is to provide expanded beads capable of producing an expanded beads molded article that is excellent in in-mold moldability and is excellent with good balance in lightweight property, flexibility, repulsion, restorability, and tensile characteristics, and to provide the molded article.

As a result of earnest investigations made by the present inventors, it has been found that the problem can be solved by employing the constitutions shown below, and thus the present invention has been completed.

Specifically, the present invention relates to the following.

[1] Crosslinked expanded beads produced by crosslinking and expanding particles containing a multi-block copolymer containing a polyethylene block and an ethylene-α-olefin copolymer block, the multi-block copolymer having a melt flow rate of from 2 to 10 g/10 min at 190° C. and a load of 2.16 kg, and a Shore A hardness of from 65 to 90 measured according to ASTM D2240, the crosslinked expanded beads having a gel fraction of from 30 to 60% by a hot xylene extraction method.

[2] An expanded beads molded article produced by subjecting the crosslinked expanded beads according to the item [1], to in-mold molding.

[3] The expanded beads molded article according to the item [2], wherein the molded article has an apparent density of from 40 to 150 g/L.

According to the present invention, expanded beads capable of producing an expanded beads molded article that is excellent in in-mold moldability and is excellent with good balance in lightweight property, flexibility, repulsion, restorability, and tensile characteristics, and the molded article can be provided.

DESCRIPTION OF EMBODIMENTS

[Crosslinked Expanded Beads]

The crosslinked expanded beads of the present invention are produced by crosslinking and expanding particles containing a multi-block copolymer containing a polyethylene block and an ethylene-α-olefin copolymer block (which may be hereinafter referred simply to a multi-block copolymer).

(Multi-Block Copolymer)

The multi-block copolymer contains a polyethylene block and an ethylene-α-olefin copolymer block. The multi-block copolymer can be shown, for example, by the following formula (1):

$$(AB)_n \qquad (1)$$

wherein n represents an integer of 1 or more, A represents a hard block, and B represents a soft block.

Herein, the hard block A (which may be hereinafter referred to as a block A) corresponds to the polyethylene block. The soft block B (which may be hereinafter referred to as a block B) corresponds to the ethylene-α-olefin copolymer block. The block A and the block B are preferably arranged in series. The block A and the block B may be arranged regularly, and are preferably arranged randomly. The multi-block copolymer preferably does not contain a third block other than the block A and the block B.

The proportion of the ethylene component in the polyethylene block constituting the block A is preferably more than 95% by mass, and more preferably more than 98% by mass, with respect to the mass of the polyethylene block. In the ethylene-α-olefin copolymer block constituting the block B, the proportion of the α-olefin component is preferably more than 5% by mass, more preferably more than 10% by mass, and further preferably more than 15% by mass, with respect to the mass of the ethylene-α-olefin copolymer block.

The proportion of the ethylene-α-olefin copolymer block constituting the block B in the multi-block copolymer is preferably from 1 to 99% by mass, and more preferably from 5 to 95% by mass, with respect to the mass of the multi-block copolymer. The proportion of the polyethylene block and the proportion of the ethylene-α-olefin copolymer block can be calculated based on data obtained by differential scanning calorimetry (DSC) or nuclear magnetic resonance (NMR).

The ethylene-α-olefin copolymer block constituting the block B in the multi-block copolymer is preferably a block of a copolymer of at least one of a $C_3$ to $C_{20}$ α-olefin and ethylene. Examples of the α-olefin copolymerized with ethylene in the ethylene-α-olefin copolymer block include propylene, 1-butene, 1-pentene, 1-hexene, 1-heptene, 1-octene, 1-nonene, 1-decene, 3-methyl-1-butene, and 4-methyl-1-pentene, which may be used in combination. From the standpoint of the industrial availability, the characteristics, and the economic efficiency, examples of the α-olefin copolymerized with ethylene include propylene, 1-butene, 1-hexene, and 1-octene, and 1-octene is particularly preferred.

Examples of the multi-block copolymer include the ethylene-α-olefin copolymer described in PTL 3. Examples of the commercially available products of the multi-block copolymer include "Infuse", a trade name, produced by The Dow Chemical Company.

The ethylene-α-olefin copolymer can be produced by using a known polymerization method using a known olefin polymerization catalyst. Examples of the production method of the ethylene-α-olefin copolymer include a slurry polymerization method, a solution polymerization method, and a gas phase polymerization method using a multisite catalyst represented by a Ziegler-Natta catalyst, and a single site catalyst represented by a metallocene catalyst and a post-metallocene catalyst, and a bulk polymerization method using a radical initiator.

The particles of the multi-block copolymer (which may be hereinafter referred to as polymer particles) may contain an additional polymer other than the multi-block copolymer in such a range that does not impair the objects and effects of the present invention. Examples of the additional polymer other than the multi-block copolymer include a thermoplastic resin, such as a polyolefin resin (for example, a polyethylene resin, a polypropylene resin, and a polybutene resin) and a polystyrene resin, a thermoplastic elastomer (for example, polybutadiene, polyisoprene, an ethylene-propylene copolymer, an ethylene-propylene-diene copolymer, and styrene-butadiene, styrene-isoprene, styrene-butadiene-styrene, and styrene-isoprene-styrene block copolymers and hydrogenated products thereof), and a dynamically crosslinked elastomer (such as ethylene-propylene rubber (EPM) and an ethylene-propylene-diene terpolymer (EPDM)). The proportion of the additional polymer mixed is preferably 10 parts by mass or less, and more preferably 5 parts by mass or less, per 100 parts by mass of the multi-block copolymer, and the crosslinked expanded beads preferably contains only the multi-block copolymer.

The melt flow rate at 190° C. and a load of 2.16 kg of the multi-block copolymer is from 2 to 10 g/10 min, preferably from 3 to 8 g/10 min, and more preferably from 4 to 7 g/10 min. In the case where the melt flow rate of the multi-block copolymer is too small, the fusion bondability of the crosslinked expanded beads may be lowered, making difficult to produce an expanded beads molded article through in-mold molding of the crosslinked expanded beads, in some cases. In the case where the melt flow rate of the multi-block copolymer is too large, an expanded beads molded article obtained through in-mold molding of the crosslinked expanded beads may have poor restorability, preventing the demanded properties from being obtained, in some cases. The melt flow rate herein is a value that is measured according to JIS K7210-1:2014 under condition of a temperature of 190° C. and a load of 2.16 kg.

The Shore A hardness of the multi-block copolymer is from 65 to 90, preferably from 75 to 90, and more preferably from 76 to 88. In the case where the Shore A hardness of the multi-block copolymer is too small, the crosslinked expanded beads of the multi-block copolymer may be contracted, and an expanded beads molded article obtained through in-mold molding of the crosslinked expanded beads may have poor restorability, preventing the demanded properties from being obtained, in some cases. In the case where the Shore A hardness of the multi-block copolymer is too large, the expanded beads molded article may have poor flexibility, preventing the demanded properties from being obtained, in some cases. The Shore A hardness is a value that is measured according to ASTM D2240.

The multi-block copolymer preferably has an apparent density of from 700 to 1,000 g/L, and more preferably from 800 to 900 g/L.

The multi-block copolymer preferably has a melting point of from 110 to 130° C., and more preferably from 115 to 125° C. When the melting point of the multi-block copolymer is in the range, the compression set at 50° C. can be made small. The melting point of the multi-block copolymer is measured by the heat flux differential scanning calorimetry described in JIS K7121 (1987). Specifically, the melting point of the multi-block copolymer can be obtained in such a manner that the multi-block copolymer is heated from 30° C. to 200° C. at a temperature rise rate of 10° C./min, then cooled to 30° C. at a cooling rate of 10° C./min, and then again heated from 30° C. to 200° C. at a temperature rise rate of 10° C./min to provide a DSC curve, and the melting point is obtained from the apex temperature of the endothermic peak determined by the DSC curve. In the case where plural endothermic peaks appear in the DSC curve for the second heating, the apex temperature of the endothermic peak having the maximum area is designated as the melting point.

The multi-block copolymer preferably has a flexural modulus of from 10 to 30 MPa, and more preferably from 12 to 30 MPa. The flexural modulus of the multi-block copolymer is a value that is measured by the measurement method described in JIS K7171:2008.

(Additional Additive)

The particles of the multi-block copolymer may contain an additional additive in such a range that does not impair the objects and effects of the present invention. Examples of the additional additive include an antioxidant, an ultraviolet ray inhibitor, an antistatic agent, a flame retardant, a flame retarding assistant, a metal deactivator, a conductive filler, and a foam regulator. Examples of the foam regulator include inorganic powder, such as zinc borate, talc, calcium carbonate, borax, aluminum hydroxide, silica, zeolite, and carbon, and organic powder, such as a phosphoric acid nucleating agent, a phenol nucleating agent, an amine nucleating agent, and polyethylene fluoride resin powder. The total amount of the additives added is preferably 20 parts by mass or less, more preferably 10 parts by mass or less, and further preferably 5 parts by mass or less, per 100 parts by mass of the multi-block copolymer. The additives are generally used in the requisite minimum amounts. The additives may be contained in the polymer particles in such a manner that in the production of the polymer particles, the additives are added to the extruder and kneaded therein along with the multi-block copolymer.

(Crosslinked Expanded Beads)

The crosslinked expanded beads of the present invention preferably has an average particle diameter of from 0.5 to 10 mm, more preferably from 1 to 8 mm, and further preferably from 2 to 5 mm. When the average particle diameter of the crosslinked expanded beads is in the range, the crosslinked expanded beads can be easily produced, and in in-mold molding of the crosslinked expanded beads, the crosslinked expanded beads can be easily filled in the metal mold. The average particle diameter of the crosslinked expanded beads can be controlled, for example, by the amount of the expanding agent, the expanding condition, the particle diameter of the polymer particles, and the like.

The crosslinked expanded beads of the present invention preferably has an apparent density of from 50 to 280 g/L, more preferably from 50 to 250 g/L, further preferably from 60 to 180 g/L, and particularly preferably from 80 to 140 g/L. When the apparent density of the crosslinked expanded beads is in the range, an expanded beads molded article produced through in-mold molding of the crosslinked expanded beads can be further improved in lightweight property, flexibility, and repulsion.

The average particle diameter of the crosslinked expanded beads and the apparent density of the crosslinked expanded beads can be measured in the following manner. A group of the crosslinked expanded beads is allowed to stand under condition of a relative humidity of 50%, a temperature of 23° C., and 1 atm for 2 days. Subsequently, a measuring cylinder having water at 23° C. placed therein is prepared, and an arbitrary amount of the group of the crosslinked expanded beads having been allowed to stand for 2 days (mass of the group of the crosslinked expanded beads: W1) is immersed in water in the measuring cylinder with a device, such as a metallic mesh. The volume V1 (L) of the group of the crosslinked expanded beads is measured by reading the elevation of the water level taking the volume of the device, such as a metallic mesh, into consideration. The volume V1 is divided by the number (N) of the crosslinked expanded beads having been placed in the measuring cylinder (V1/N), so as to calculate the average volume per one of the crosslinked expanded beads. The diameter of the virtual true sphere that has the same volume as the resulting average volume is designated as the average particle diameter (mm) of the crosslinked expanded beads. The apparent density of the crosslinked expanded beads can be obtained by dividing the mass W1 (g) of the group of the-crosslinked expanded beads having been placed in the measuring cylinder by the volume V1 (W1/V1).

The gel fraction by a hot xylene extraction method of the crosslinked expanded beads is from 30 to 60%. In the case where the gel fraction is too small, an expanded beads molded article obtained through in-mold molding of the crosslinked expanded beads may have poor restorability to fail to provide the desired properties, in some cases. In the case where the gel fraction is too large, the fusion bondability of the crosslinked expanded beads may be lowered, making difficult to produce the expanded beads molded article, in some cases. In this point of view, the gel fraction of the crosslinked expanded beads is preferably from 35 to 58%, and more preferably from 40 to 55%. In the case where polymer particles having a relatively small melt flow rate are used, the gel fraction is preferably smaller within the aforementioned range. In the case where polymer particles having a relatively large melt flow rate are used, the gel fraction is preferably larger within the aforementioned range.

The gel fraction can be controlled by the amount of the crosslinking agent described later added, and also can be controlled by the agitation condition, the temperature rise condition, and the like in the crosslinking of the polymer particles in a closed vessel. The gel fraction by a hot xylene extraction method can be measured in the following manner. The specimen weighed in an amount of approximately 1 g (the mass of the specimen weighed is designated as G1 (g)) is boiled in 100 g of xylene for 6 hours, and then immediately filtered with a 100-mesh metallic mesh. Subsequently, the fraction insoluble in boiling xylene remaining on the metallic mesh is dried with a dryer at 80° C. under reduced pressure for 8 hours, and the insoluble fraction is weighed for the mass thereof (the mass of the fraction insoluble in boiling xylene weighed is designated as G2 (g)). The gel fraction is obtained from the mass of the specimen and the mass of the fraction insoluble in boiling xylene according to the following expression (2).

$$\text{Gel fraction (\%)}=G2\ (g)/G1\ (g)\times 100 \quad (2)$$

An anionic surfactant may be attached to the surface of the crosslinked expanded beads of the present invention, and thereby the fusion bondability of the crosslinked expanded beads in in-mold molding can be enhanced. Examples of the anionic surfactant include a carboxylic acid type, a sulfonic acid type, a sulfate ester type, a phosphate ester type, and a polymer type. In the anionic surfactant, an alkanesulfonate salt, a polyacrylate salt, or a salt of a polyacrylic acid-sulfonic acid copolymer is preferably attached to the surface of the crosslinked expanded beads since the crosslinked expanded beads that are excellent in the effect of enhancing the fusion bondability in in-mold molding can be obtained. The anionic surfactant may be used solely or as a mixture of two or more kinds thereof.

The attached amount of the anionic surfactant to the crosslinked expanded beads per unit surface area is preferably 2 mg/m$^2$ or more, more preferably 5 mg/m$^2$ or more, and particularly preferably 20 mg/m$^2$ or more. The upper limit of the attached amount thereof per unit surface area may be approximately 100 mg/m$^2$ or less. The attached amount of the anionic surfactant to the crosslinked expanded beads may be a value that is calculated based on a value measured with a TOC (total organic carbon) measuring device. The measurement of TOC may be performed by a TC-IC method using Shimadzu Total Organic Carbon Analyzer TOC-VCSH.

[Production Method of Crosslinked Expanded Beads]

The crosslinked expanded beads of the present invention can be produced by a method containing a step (A), a step (B), a step (C), and a step (D) described below.

(Step (A))

In the step (A), polymer particles are dispersed in a dispersion medium in a closed vessel.

Polymer particles are produced by a known method, such as a method, in which the multi-block copolymer is fed to an extruder and kneaded to form a molten kneaded material, the molten kneaded material is extruded from the extruder into a strand form, and the strand is cut into a size suitable for forming the crosslinked expanded beads. For example, the polymer particles can be obtained in such a manner that in the aforementioned method, the molten kneaded material having been extrusion-molded into a strand form is cooled with water, and then cut into a prescribed length. For cutting into a prescribed length, for example, a strand cutting method may be employed. In alternative, the polymer particles can be obtained by a hot cutting method, in which the molten kneaded material is cut immediately after extruding, an underwater cutting method, in which the molten kneaded material is cut in water, and the like.

The average mass per one of the polymer particles is generally preferably from 0.01 to 10 mg, and more preferably from 0.1 to 5 mg. The average mass of the polymer particles is a value that is obtained by dividing the mass (mg) of 100 of the randomly selected polymer particles by 100.

(Dispersion Medium)

The dispersion medium used in the step (A) is not particularly limited, as far as the dispersion medium does not dissolve the polymer particles. Examples of the dispersion medium include water, ethylene glycol, glycerin, methanol, and ethanol. The dispersion medium is preferably water.

(Dispersion)

The polymer particles are dispersed in the dispersion medium. The dispersion method may be, for example, a method of dispersing the polymer particles in the dispersion medium by using an agitator.

In the step (A), a dispersant may be further added to the dispersion medium. Examples of the dispersant include an organic dispersant, such as polyvinyl alcohol, polyvinylpyrrolidone, and methyl cellulose, and a sparingly soluble inorganic salt, such as aluminum oxide, zinc oxide, kaolin, mica, magnesium phosphate, and tricalcium phosphate. A surfactant may be further added to the dispersion medium. Examples of the surfactant include sodium oleate and sodium dodecylbenzenesulfonate, and also include an anionic surfactant, a nonionic surfactant, and the like that are generally used in suspension polymerization.

(Closed Vessel)

The closed vessel used in the step (A) is not particularly limited, as far as the vessel can be closed air-tightly. In the step (B) described later, the copolymer particles are heated to increase the pressure inside the closed vessel, and therefore the closed vessel necessarily withstands the pressure increase in the step (B). The closed vessel may be, for example, an autoclave.

(Crosslinking Agent)

In the step (A), a crosslinking agent may be used in the dispersion medium for crosslinking the polymer particles. The crosslinking agent may be added to the dispersion medium in advance, and may be added to the dispersion medium after dispersing the polymer particles therein. The crosslinking agent is not particularly limited, as far as the crosslinking agent can crosslink the multi-block copolymer. Examples of the crosslinking agent include a peroxide compound, such as dicumyl peroxide, 2,5-t-butyl perbenzoate, and 1,1-bis-t-butylperoxycyclohexane. These compounds may be used solely or as a combination of two or more kinds thereof. The amount of the crosslinking agent mixed is preferably from 0.6 to 1 part by mass, more preferably from 0.65 to 0.95 part by mass, and further preferably from 0.7 to 0.9 part by mass, per 100 parts by mass of the multi-block copolymer. When the amount of the crosslinking agent mixed is in the range, crosslinked particles having a sufficient gel fraction can be obtained since the crosslinking efficiency of the polymer particles is enhanced, and thereby the crosslinked particles can be sufficiently expanded, and a strength capable of withstanding the expansion can be imparted thereto.

(Step (B))

In the step (B), the polymer particles dispersed in the dispersion medium in the step (A) are heated in the closed vessel to a temperature that is equal to or higher than the temperature, at which the multi-block copolymer of the polymer particles is softened, and the crosslinking agent is substantially decomposed. According to the procedure, the multi-block copolymer is crosslinked. The heating temperature is not particularly limited, and may be, for example, in a range of from 100 to 170° C.

(Step (C))

In the step (C), after the step (B), an expanding agent for expanding the crosslinked particles to the dispersion medium in the closed vessel, and the crosslinked particles in a softened state is impregnated with the expanding agent. The temperature for the impregnation of the expanding agent is not particularly limited, as far as the temperature is equal to or higher than the temperature, at which the crosslinked particles are in a softened state, and may be, for example, in a range of from 100 to 170° C.

(Expanding Agent)

The expanding agent used in the step (C) is not particularly limited, as far as the expanding agent can expand the crosslinked particles. Examples of the expanding agent include an inorganic physical expanding agent, such as air, nitrogen, carbon dioxide, argon, helium, oxygen, and neon, and an organic physical expanding agent, such as an aliphatic hydrocarbon, e.g., propane, n-butane, isobutane, n-pentane, isopentane, and n-hexane, an alicyclic hydrocarbon, e.g., cyclohexane and cyclopentane, a halogenated hydrocarbon, e.g., chlorofluoromethane, trifluoromethane, 1,1-difluoroethane, 1,1,1,2-tetrafluoroethane, methyl chloride, ethyl chloride, and methylene chloride, and a dialkyl ether, e.g., dimethyl ether, diethyl ether, and methyl ethyl ether. Among these, an inorganic physical expanding agent is preferred since it does not deplete the ozone layer and is inexpensive, nitrogen, air, and carbon dioxide are more preferred, and carbon dioxide is particularly preferred. The expanding agent may be used solely or as a combination of two or more kinds thereof. The amount of the expanding agent mixed may be determined in consideration of the apparent density of the target expanded beads, the kind of the multi-block copolymer, the kind of the expanding agent, and the like, and is generally preferably from 5 to 50 parts by mass for the organic physical expanding agent and preferably from 0.5 to 30 parts by mass for the inorganic physical expanding agent, per 100 parts by mass of the multi-block copolymer. The crosslinking, impregnation, and expanding steps described above are preferably performed as a series of steps in the same closed vessel.

(Step (D))

In the step (D), the expandable crosslinked particles having been impregnated with the expanding agent and heated in the step (C) are discharged to an atmosphere having a pressure that is lower than the pressure in the closed vessel, so as to produce crosslinked expanded beads. Specifically, the crosslinked expanded beads are produced in such a manner that while retaining the pressure in the closed vessel to a pressure equal to or higher than the vapor pressure of the expanding agent, one end of the closed vessel under the water surface is opened, so as to discharge the expandable crosslinked particles containing the expanding agent along with the dispersion medium from the interior of the closed vessel to an atmosphere having a pressure that is lower than the pressure in the closed vessel, generally to the atmospheric pressure, thereby expanding the expandable crosslinked particles.

As the production method of the crosslinked expanded beads, while the method of producing in a closed vessel has been described above, the production method of the crosslinked expanded beads is not limited to the aforementioned production method. For example, two methods shown below may also be used. One of the methods is a method, in which the multi-block copolymer, the crosslinking agent, and the expanding agent are fed to an extruder and melted, so that the multi-block copolymer is crosslinked and impregnated, and then the crosslinked multi-block copolymer is extruded and expanded from a die attached to the apex of the extruder, so as to produce a crosslinked expanded material of the multi-block copolymer, which is cooled and then pelletized for cutting into a bead form. The other one of the methods is a method, in which the expandable crosslinked particles obtained through the steps (A) to (C) are taken out from the closed vessel, and dehydrated and dried, and then the expandable crosslinked particles are heated with a heating medium to form the crosslinked expanded beads. While the method of crosslinking the polymer particles with an organic peroxide has been described above, the crosslinking process in the present invention is not limited to the use of an organic peroxide, and other known methods may also be used, for example, the crosslinked particles or the crosslinked expanded beads can be obtained through a crosslinking process using an electron beam crosslinking method or the like.

[Expanded Beads Molded Article]

The expanded beads molded article can be obtained by subjecting the crosslinked expanded beads of the present invention to in-mold molding.

(In-Mold Molding)

The expanded beads molded article can be obtained by filling the crosslinked expanded beads in a molding die, and heating with a heating medium, such as steam, for molding, according to a known method. Specifically, the expanded beads molded article can be obtained in such manner that the crosslinked expanded beads are filled in a molding die, and then the crosslinked expanded beads are heated and expanded by introducing a heating medium, such as steam, into the molding die, thereby forming into the shape of the molding cavity through fusion bonding of the beads to each other. The in-mold molding in the present invention is preferably performed by a pressure molding method (see, for example, JP-B-51-22951). In the pressure molding method, the crosslinked expanded beads are subjected in advance to a pressure treatment with a pressurized gas, such as air, to increase the pressure inside the crosslinked expanded beads for controlling the pressure inside the crosslinked expanded beads to from 0.01 to 0.2 MPa (G) (G means the gauge pressure), and then the crosslinked expanded beads are filled in a cavity of a molding die under the atmospheric pressure or reduced pressure, followed by closing the die. Subsequently, a heating medium, such as steam, is introduced into the die for molding the crosslinked expanded beads through fusion bonding thereof with heat.

(Apparent Density)

The expanded beads molded article of the present invention preferably has an apparent density of from 40 to 220 g/L, more preferably from 40 to 150 g/L, further preferably from 45 to 140 g/L, and particularly preferably from 50 to 130 g/L. In the case where the apparent density of the expanded beads molded article is in the range, the expanded beads molded article may be excellent with good balance in lightweight property, flexibility, repulsion, restorability, and tensile characteristics. The apparent density (g/L) of the expanded beads molded article can be obtained by dividing the mass W (g) of the molded article by the volume V thereof (W/V).

(Fusion Bondability)

The fusion bondability can be evaluated by a material fracture ratio obtained in such a manner that the molded article is fractured by bending, and the ratio of the expanded beads that undergo material failure with respect to the expanded beads that are exposed to the fracture surface is designated as the material fracture ratio. The material fracture ratio is preferably 80% or more, and more preferably 95% or more. In the case where the fusion bondability is in the range, the molded article may be excellent in properties, such as the maximum tensile stress and the tensile breaking elongation, and may be suitable for purposes including a seat cushioning material, a pad material for sporting, a shoe sole material, and the like.

(Compression Stress at 50% Strain)

The compression stress at 50% strain of the expanded beads molded article can be obtained according to JIS K6767:1999. A lower value of the compression stress at 50% strain means better flexibility, and the expanded beads molded article may be suitable for purposes including a seat cushioning material, a pad material for sporting, a shoe sole material, and the like. In the case where the expanded beads molded article is applied to the aforementioned purposes, the compression stress is preferably 300 kPa or less, more preferably 250 kPa or less, and further preferably 200 kPa or less.

(Compression Set)

The expanded beads molded article of the present invention preferably has a compression set measured at a temperature of 23° C. according to JIS K6767:1999 of 5% or less, more preferably 3% or less, and further preferably 2% or less. The expanded beads molded article of the present invention preferably has a compression set measured at a high temperature of 50° C. of 15% or less, more preferably 10% or less, and further preferably 7% or less. When the expanded beads molded article is in the ranges, the molded article may be excellent in restorability of the shape after compression, and thus may be suitable for purposes including a seat cushioning material, a pad material for sporting, a shoe sole material, and the like.

(Maximum Tensile Stress and Tensile Breaking Elongation by Tension)

The expanded beads molded article preferably has a maximum tensile stress of 0.25 MPa or more, more preferably 0.3 MPa or more, and further preferably 0.4 MPa or more. The upper limit of the maximum tensile stress is not particularly limited, and may be approximately 1 MPa. The expanded beads molded article preferably has a tensile breaking elongation of 80% or more, more preferably 100% or more, and further preferably 150% or more. When the tensile breaking elongation is in the range, the expanded beads molded article may be excellent in tensile characteristics, and thus may be suitable for the aforementioned purposes. The maximum tensile stress and the tensile breaking elongation by tension of the expanded beads molded article can be obtained subjecting the expanded beads molded article to a tensile test according to JIS K6767:1999.

(Modulus of Repulsion Elasticity)

The modulus of repulsion elasticity of the expanded beads molded article can be obtained by a falling ball test applied to the expanded beads molded article as a test piece. In the falling ball test, an iron ball of 254.6 g is made to fall from a height of 600 mm, the bounce height H (mm) of the iron ball bouncing from the test piece is measured, and the modulus of repulsion elasticity is obtained according to the expression (3).

$$\text{modulus of repulsion elasticity } (\%) = H/600 \times 100 (\%) \quad (3)$$

The modulus of repulsion elasticity of the expanded beads molded article is preferably 45% or more, more preferably 50% or more, and further preferably 60% or more. The upper limit thereof may be approximately 90%. When the modulus of repulsion elasticity is in the range, the expanded beads molded article may be excellent in repulsion, and thus may be suitable for purposes including a seat cushioning material, a pad material for sporting, a shoe sole material, and the like.

In the present invention, the crosslinked expanded beads produced by crosslinking and expanding particles containing a multi-block copolymer containing a polyethylene block and an ethylene-α-olefin copolymer block, the multi-block copolymer having a melt flow rate of from 2 to 10 g/10 min at 190° C. and a load of 2.16 kg, and a Shore A hardness of from 65 to 90 measured according to ASTM D2240, the crosslinked expanded beads having a gel fraction of from 30 to 60% by a hot xylene extraction method are subjected to in-mold molding, and thereby an expanded beads molded article excellent in fusion bondability without contraction can be obtained. The crosslinked expanded beads of the present invention are excellent in moldability, and thus the expanded beads molded article obtained with the crosslinked expanded beads is excellent with good balance in lightweight property, flexibility, restorability, and tensile characteristics.

EXAMPLES

The present invention will be then described with reference to examples below, but the present invention is not limited to the examples.
[Evaluation]
The multi-block copolymers and the particles of the multi-block copolymer used in Examples and Comparative Examples were evaluated in the following manners.
(Apparent Density of Multi-Block Copolymer)
The apparent density of the multi-block copolymer was measured according to ASTM D792.
(Shore A Hardness)
The Shore A hardness of the multi-block copolymer was measured according to ASTM D2240.
(Melt Flow Rate)
The melt flow rate of the multi-block copolymer was measured according to JIS K7210-1:2014 under condition of a temperature of 190° C. and a load of 2.16 kg.
(Melting Point of Multi-Block Copolymer)
The melting point of the multi-block copolymer was obtained according to JIS K7121-1987. Specifically, the melting point of the multi-block copolymer was measured with 2 mg of the multi-block copolymer in a pellet form as a test piece based on the heat flux differential scanning calorimetry described in JIS K7121 (1987) in the following manner. The multi-block copolymer was heated from 30° C. to 200° C. at a temperature rise rate of 10° C./min, then cooled to 30° C. at a cooling rate of 10° C./min, and then again heated from 30° C. to 200° C. at a temperature rise rate of 10° C./min to provide a DSC curve, and the apex temperature of the endothermic peak determined by the DSC curve was designated as the melting point. The measuring device used was a heat flux differential scanning calorimeter (Model No. DSC7020, produced by SII Nanotechnology, Inc.).
(Flexural Modulus)
The flexural modulus of the multi-block copolymer was measured according to the measurement method described in JIS K7171:2008. The flexural modulus was measured in the following manner. The multi-block copolymer was formed into a sheet by heat-press and cut into a test piece having a thickness of 4 mm, a width of 10 mm, and a length of 80 mm, which was allowed to stand in a thermostat chamber at room temperature of 23° C. and a humidity of 50% for 24 hours. The test piece was then measured with Autograph AGS-10kNG (produced by Shimadzu Corporation) under condition of a distance between supporting points of 64 mm, a radius of the indenter $R_1$ of 5.0 mm, a radius of the pedestal $R_2$ of 5.0 mm, a test speed of 2 mm/min, room temperature of 23° C., and a humidity of 50%, and the arithmetic average of the calculated values (5 values) was designated as the flexural modulus.

The crosslinked expanded beads produced in Examples and Comparative Examples were evaluated in the following manners.
(Apparent Density of Crosslinked Expanded Beads)
The apparent density of the crosslinked expanded beads was obtained in the following manner. Approximately 500 cm$^3$ of a group of the crosslinked expanded beads having been allowed to stand under condition of a temperature of 23° C., a relative humidity of 50%, and 1 atm for 2 days was measured for mass (g). The group of the crosslinked expanded beads was immersed in 300 cc of water at 23° C. placed in a 1 L measuring cylinder with a metallic mesh, and the volume V (cm$^3$) of the group of the crosslinked expanded beads was obtained from the scale of the elevation of the water level. The value obtained by dividing the mass W of the group of the crosslinked expanded beads by the volume V thereof (W/V) was converted to a unit (g/L) and designated as the apparent density thereof.
(Gel Fraction)
The gel fraction was obtained in the following manner. A specimen of the crosslinked expanded particles weighed in an amount of approximately 1 g (the mass of the specimen weighed was designated as G1 (g)) was boiled in 100 g of xylene for 8 hours, and then immediately filtered with a 100-mesh metallic mesh, and then the fraction insoluble in boiling xylene remaining on the metallic mesh was dried at 20° C. for 24 hours and then weighed for the mass thereof (the mass of the fraction insoluble in boiling xylene weighed was designated as G2 (g)). The gel fraction was calculated by the following expression (2).

$$\text{Gel fraction (\%)}=G2\,(g)/G1\,(g)\times100 \qquad (2)$$

The expanded beads molded articles produced in Examples and Comparative Examples were evaluated in the following manners.
(Apparent Density of Expanded Beads Molded Article)
The apparent density of the expanded beads molded article was obtained in the following manner. From the expanded beads molded article, 3 test pieces each in the form of a cuboid having a length of 50 mm, a width of 50 mm, and a thickness of 25 mm were randomly cut out while removing the skin layer formed on molding, and each were measured for the mass and the volume of the test pieces. The apparent densities of the 3 test pieces were calculated therefrom, and the arithmetic average thereof for the 3 test pieces was designated as the apparent density of the molded article.
(Compression Stress at 50% Strain)
The mechanical strength of the expanded beads molded article was evaluated by measuring the 50% compression stress of the expanded beads molded article. The 50% compression stress was obtained in the following manner. From the expanded beads molded article, 3 test pieces each in the form of a cuboid having a length of 50 mm, a width of 50 mm, and a thickness of 25 mm were randomly cut out while removing the skin layer formed on molding, and each were measured for the load at 50% strain according to JIS K6767:1999 with Autograph AGS-X (produced by Shimadzu Corporation) under condition of a temperature of 23° C. and a relative humidity of 50%, at a compression speed of 10 mm/min, and the load at 50% strain was divided by the pressure receiving area of the test piece to provide the 50% compression stress (kPa). The arithmetic average of the 50% compression stress for the 3 test pieces was designated as the 50% compression stress of the molded article.

(Compression Set)

The compression set of the expanded beads molded article was obtained in the following manner. From the expanded beads molded article, 3 test pieces each in the form of a cuboid having a length of 50 mm, a width of 50 mm, and a thickness of 25 mm were randomly cut out while removing the skin layer formed on molding. According to JIS K6767:1999, the test pieces each were allowed to stand in a state of compression by 25% in the thickness direction under an environment of a relative humidity of 50% at temperatures of 23° C. and 50° C. each for 22 hours, and after 24 hours from the release of compression, measured for the thickness, and the compression set (%) was obtained for each of the test pieces. The arithmetic average thereof for the 3 test pieces was designated as the compression set of the molded article.

(Maximum Tensile Stress and Tensile Breaking Elongation by Tension)

A cut-out piece was produced according to JIS K6767:1999 in such a manner that the expanded beads molded article was cut with a vertical slicer to a size of 120 mm×25 mm×10 mm so that all the surfaces thereof were cut surfaces. Subsequently, the cut-out piece was measured for density (g/L). A test piece was produced by cutting the cut-out piece with a jig saw into the No. 1 dumbbell form (having a measurement portion having a length of 40 mm, a width of 10 mm, and a thickness of 10 mm). The maximum tensile stress and the tensile breaking elongation by tension were measured by performing a tensile test for the test piece at a test speed of 500 mm/min. The tensile breaking elongation was obtained by substituting the value of the length L (mm) of the test piece at the tensile breakage into the following expression (4).

$$\text{Tensile breaking elongation} = L/40 \times 100 (\%) \quad (4)$$

The density (g/L) of the test piece was obtained by dividing the mass w (g) by the volume v (cm$^3$) obtained from the length, width, and thickness thereof, and subjecting to unit conversion.

(Modulus of Repulsion Elasticity)

The modulus of repulsion elasticity of the expanded beads molded article was evaluated by a falling ball test. A measurement specimen was prepared by cutting the expanded beads molded article into a test piece having a length of 50 mm, a width of 50 mm, and a thickness of 40 mm. The test piece was cut in such a manner that one of the flat surfaces (50 mm×50 mm) had the skin surface. The evaluation was performed in such a manner that the test piece was placed on a flat plane to make the skin surface directed upward, an iron ball of 254.6 g was made to fall from a height of 600 mm, the bounce height H (mm) of the iron ball bouncing from the test piece was measured, and the modulus of repulsion elasticity was obtained according to the expression (3).

$$\text{modulus of repulsion elasticity } (\%) = H/600 \times 100(\%) \quad (3)$$

(Fusion Bondability)

The fusion bondability of the expanded beads molded article was evaluated in such a manner that plural material fracture ratios were obtained, and the fusion bondability was evaluated by the arithmetic average thereof. The material fracture ratio was obtained in such a manner that the expanded beads molded article was fractured by bending, the number (C1) of the expanded beads present on the fracture surface and the number (C2) of the broken expanded beads were obtained, and the material fracture ratio was calculated from the ratio of the broken expanded beads to the expanded beads present (C2/C1×100). The fusion bondability was evaluated in such a manner that the aforementioned measurement was performed 5 times with different test pieces to provide the material fracture ratios, and the fusion bondability was evaluated by the arithmetic average thereof. In the evaluation, a material fracture ratio of 95% or more was designated as "excellent", a material fracture ratio of 80% or more and less than 95% was designated as "good", a material fracture ratio of 20% or more and less than 80% was designated as "poor", and a material fracture ratio less than 20% was designated as "bad".

(Contraction of Expanded Beads Molded Article)

The contraction of the expanded beads molded article, i.e., the formation of a concave shape inside, was evaluated in such a manner that the expanded beads molded article obtained through in-mold molding was dried and aged by heating in an oven adjusted to 60° C. for 12 hours, and then the dimension of the expanded beads molded article in the thickness direction thereof was measured. In the specific measurement method, the expanded beads molded article corresponding to the dimension of the flat plate die having a length of 250 mm, a width of 200 mm, and a thickness of 50 mm used in the in-mold molding was measured for thickness at the edge portion (i.e., the position inside from the edge by 10 mm) and the center portion (i.e., the position equally dividing in both the longitudinal direction and the transverse direction). Subsequently, the thickness ratio of the expanded beads molded article ((thickness at center portion)/(thickness at edge portion)×100(%)) was calculated. The contraction was evaluated in such a manner that a thickness ratio of 95% or more was designated as "good", and a thickness ratio of less than 95% was designated as "bad".

[Production of Crosslinked Expanded Beads and Expanded Beads Molded Articles in Examples and Comparative Examples]

The production methods of the crosslinked expanded beads and the expanded beads molded articles in Examples and Comparative Examples will be described.

Example 1

<Production of Particles of Multi-Block Copolymer>

An ethylene-α-olefin multi-block copolymer (the polymer 1 (see Table 1)) having a melting point of 120° C., a melt flow rate of 5.4 g/10 min (at 190° C. and a load of 2.16 kg), and a Shore A hardness of 86 containing a polyethylene block and an ethylene-α-olefin copolymer block was placed in an extruder, melt-kneaded, extruded from a die having a diameter of 2 mm to a strand form, cooled in water, and cut for granulation with a pelletizer to a particle mass of approximately 5 mg, thereby providing particles of the multi-block copolymer.

<Production of Crosslinked Expanded Beads>

1 kg of the resulting particles of the multi-block copolymer was mixed with 3 L of water as a dispersion medium, 3 g of kaolin as a dispersant, 0.04 g of sodium alkylbenzenesulfonate, dicumyl peroxide as a crosslinking agent in an amount of 0.8 part by mass per 100 parts by mass of the multi-block copolymer, and the mixture was filled in a closed vessel having a capacity of 5 L along with 2.0 parts by mass of dry ice as an expanding agent, heated to 160° C. as the crosslinking and expanding temperature under agitation, and after retaining for 30 minutes, discharged to the atmospheric pressure, thereby providing the crosslinked expanded beads. The vapor pressure herein was 1.7 MPa (G).

<Production of Expanded Beads Molded Article>

The resulting crosslinked expanded beads were placed in a closed vessel, pressurized with compressed air of 0.2 MPa (G) for 12 hours to impart an inner pressure of 0.14 MPa (G) to the crosslinked expanded beads, and after taking out from the vessel, subjected to in-mold molding in such a manner that the crosslinked expanded beads were filled in a flat plate die having a length of 250 mm, a width of 200 mm, and a thickness of 50 mm, and after heating with steam, cooled and taken out from the die, and the resulting expanded beads molded article was dried and aged by heating in an oven adjusted to 60° C. for 12 hours, and taken out therefrom, thereby providing an expanded beads molded article.

Example 2

Crosslinked expanded beads and an expanded beads molded article were produced in the same manner as in Example 1 except that in the production of the crosslinked expanded beads, the amount of dry ice was changed to 4.0 parts by mass, and the vapor pressure of the expanding condition was changed to 2.5 MPa (G).

Example 3

Crosslinked expanded beads and an expanded beads molded article were produced in the same manner as in Example 1 except that in the production of the crosslinked expanded beads, the amount of dry ice was changed to 8.0 parts by mass, and the vapor pressure of the expanding condition was changed to 4.5 MPa (G).

Example 4

Crosslinked expanded beads and an expanded beads molded article were produced in the same manner as in Example 1 except that in the production of the crosslinked expanded beads, the amount of dry ice was changed to 1.0 parts by mass.

Example 5

Crosslinked expanded beads were produced in the same manner as in Example 2, and then placed in a blender having a solution obtained by dissolving 0.27 g of sodium polyacrylate in 50 mL of water, and the mixture was agitated for 15 minutes, and then dried in an oven at 40° C. for 12 hours, thereby providing crosslinked expanded beads of Example 5. An expanded beads molded article was produced by placing the resulting crosslinked expanded beads in a closed vessel, and performing in-mold molding with cracking filling (cracking ratio: 75%) without pressurizing. Specifically, while the mold was not completely clamped on filling the crosslinked expanded beads, the crosslinked expanded beads were filled in a state where the mold was expanded by 75% from the volume of the molding closed vessel, and then the mold was completely clamped to the volume of the molding closed vessel, followed by performing in-mold molding.

Example 6

Crosslinked expanded beads and an expanded beads molded article were produced in the same manner as in Example 1 except that the polymer used was changed to the polymer 2 (see Table 1).

Example 7

Crosslinked expanded beads and an expanded beads molded article were produced in the same manner as in Example 1 except that the polymer used was changed to the polymer 2 (see Table 1), and the vapor pressure in the production of the crosslinked expanded beads was changed to 2.5 MPa (G).

Example 8

Crosslinked expanded beads and an expanded beads molded article were produced in the same manner as in Example 1 except that the polymer used was changed to the polymer 2 (see Table 1), and the vapor pressure in the production of the crosslinked expanded beads was changed to 4.0 MPa (G).

Example 9

Crosslinked expanded beads and an expanded beads molded article were produced by using the same particles of the multi-block copolymer as in Example 1 in the same manner as in Example 1 except that dicumyl peroxide as a crosslinking agent in the crosslinking and expanding step was mixed in an amount of 0.7 part by mass per 100 parts by mass of the particles of the multi-block copolymer.

Comparative Example 1

Crosslinked expanded beads were produced in the same manner as in Example 1 except that the polymer 3 (see Table 1) was used. However, the expanded beads molded article was contracted, and contraction was found therein.

Comparative Example 2

Crosslinked expanded beads were produced in the same manner as in Example 1 except that the polymer 4 (see Table 1) was used. However, the expanded beads molded article was significantly inferior in fusion bondability, and contraction was found therein. The measurements for the 50% compression stress, the compression set, and the modulus of repulsion elasticity (falling ball test) were impossible to perform due to the fusion bonding failure of the expanded beads molded article.

Comparative Example 3

Crosslinked expanded beads were produced in the same manner as in Example 1 except that the polymer 5 (see Table 1) was used. However, the expanded beads molded article was significantly inferior in fusion bondability, and contraction was found therein. The measurements for the 50% compression stress, the compression set, and the modulus of repulsion elasticity (falling ball test) were impossible to perform due to the fusion bonding failure of the expanded beads molded article.

Comparative Example 4

Crosslinked expanded beads having a large gel fraction were obtained by using the same particles of the multi-block copolymer as in Example 1 in the same manner as in Example 1, and mixing dicumyl peroxide as a crosslinking agent in the crosslinking and expanding step in an amount of 1.0 part by mass per 100 parts by mass of the particles of the multi-block copolymer. However, the expanded beads molded article was inferior in fusion bondability, and contraction was found therein.

Comparative Example 5

Crosslinked expanded beads having a small gel fraction were obtained by using the same particles of the multi-block copolymer as in Example 1 in the same manner as in Example 1, and mixing dicumyl peroxide as a crosslinking agent in the crosslinking and expanding step in an amount of 0.6 part by mass per 100 parts by mass of the particles of the multi-block copolymer. However, the crosslinked expanded beads were not fusion-bonded in a range with small contraction to fail to provide a favorable molded article.

The polymers 1 to 5 used in the production of the expanded beads in Examples and Comparative Examples are shown in Table 1 below, the crosslinking conditions and the expanding conditions thereof and the molding conditions in the production of the expanded beads molded articles in Examples and Comparative Examples are shown in Table 2 below.

TABLE 1

Polymers constituting Examples and Comparative Examples

| Abbreviation | Composition | Product name | Apparent density (g/L) | Melting point (° C.) | Melt flow rate (g/10 min) | Shore A hardness | Flexural modulus (MPa) |
|---|---|---|---|---|---|---|---|
| Polymer 1 | Multi-block copolymer of polyethylene block and ethylene-α-olefin copolymer block | Dow Chemical Company, INFUSE 9530 | 887 | 120 | 5 | 86 | 28 |
| Polymer 2 | Multi-block copolymer of polyethylene block and ethylene-α-olefin copolymer block | Dow Chemical Company, INFUSE 9500 | 877 | 120 | 6 | 76 | 13 |
| Polymer 3 | Multi-block copolymer of polyethylene block and ethylene-α-olefin copolymer block | Dow Chemical Company, INFUSE 9817 | 877 | 123 | 16 | 75 | 11 |
| Polymer 4 | Multi-block copolymer of polyethylene block and ethylene-α-olefin copolymer block | Dow Chemical Company, INFUSE 9100 | 877 | 120 | 1 | 75 | 14 |
| Polymer 5 | Multi-block copolymer of polyethylene block and ethylene-α-olefin copolymer block | Dow Chemical Company, INFUSE 9507 | 866 | 122 | 6 | 60 | 8 |

TABLE 2

Production conditions in Examples and Comparative Examples

| Object | Item of conditions | Unit | Example 1 | Example 2 | Example 3 | Example 4 | Example 5 | Example 6 | Example 7 |
|---|---|---|---|---|---|---|---|---|---|
| Crosslinking condition of particles of multi-block copolymer | Amount of crosslinking agent added to 100 parts by mass of multi-block copolymer | part by mass | 0.8 | 0.8 | 0.8 | 0.8 | 0.8 | 0.8 | 0.8 |
| | Impregnation temperature | ° C. | 110 | 110 | 110 | 110 | 110 | 110 | 110 |
| | Crosslinking temperature | ° C. | 160 | 160 | 160 | 160 | 160 | 160 | 160 |
| | Retention time | min | 30 | 30 | 30 | 30 | 30 | 30 | 30 |
| Expanding condition of crosslinked expanded beads | Expanding temperature | ° C. | 160 | 160 | 160 | 160 | 160 | 160 | 160 |
| | Vapor pressure | MPa | 1.7 | 2.5 | 4.0 | 1.2 | 2.5 | 1.7 | 2.5 |
| Molding condition of expanded beads molded article | Internal pressure | MPa | 0.14 | 0.13 | 0.14 | 0.14 | 0 | 0.12 | 0.11 |
| | Molding pressure | MPa | 0.14 | 0.14 | 0.14 | 0.18 | 0.16 | 0.14 | 0.10 |

| Object | Item of conditions | Unit | Example 8 | Example 9 | Comparative Example 1 | Comparative Example 2 | Comparative Example 3 | Comparative Example 4 | Comparative Example 5 |
|---|---|---|---|---|---|---|---|---|---|
| Crosslinking condition of particles of multi-block copolymer | Amount of crosslinking agent added to 100 parts by mass of multi-block copolymer | part by mass | 0.8 | 0.7 | 1.0 | 0.6 | 0.8 | 1.0 | 0.6 |
| | Impregnation temperature | ° C. | 110 | 110 | 110 | 110 | 110 | 110 | 110 |
| | Crosslinking temperature | ° C. | 160 | 160 | 160 | 160 | 160 | 160 | 160 |
| | Retention time | min | 30 | 30 | 30 | 30 | 30 | 30 | 30 |
| Expanding condition of crosslinked expanded beads | Expanding temperature | ° C. | 160 | 160 | 160 | 160 | 160 | 160 | 160 |
| | Vapor pressure | MPa | 4.0 | 3.0 | 2.5 | 2.5 | 3.5 | 4.0 | 4.0 |
| Molding condition of expanded beads molded article | Internal pressure | MPa | 0.14 | 0.14 | 0.11 | 0.10 | 0.13 | 0.12 | 0.12 |
| | Molding pressure | MPa | 0.10 | 0.12 | 0.14 | 0.24 | 0.08 | 0.20 | 0.08 |

[Evaluation Results]

The evaluation results of Examples and Comparative Examples are shown in Table 3 below.

considerable contraction occurred in the in-mold molding, making difficult to provide a favorable expanded beads molded article.

TABLE 3

Evaluation results of Examples and Comparative Examples

| | Evaluation items | Unit | Example 1 | Example 2 | Example 3 | Example 4 | Example 5 | Example 6 | Example 7 |
|---|---|---|---|---|---|---|---|---|---|
| Particles of multi-block copolymer | Polymer | — | Polymer 1 | Polymer 1 | Polymer 1 | Polymer 1 | Polymer 1 | Polymer 2 | Polymer 2 |
| Crosslinked expanded particles | Apparent density | g/L | 180 | 117 | 83 | 272 | 117 | 176 | 136 |
| | Gel fraction | wt % | 51 | 47 | 54 | 50 | 47 | 48 | 46 |
| Expanded beads molded article | Apparent density | g/L | 137 | 89 | 53 | 218 | 145 | 146 | 97 |
| | 50% Compression stress | kPa | 230 | 146 | 103 | 90 | 239 | 185 | 120 |
| | Compression set 23° C. | % | 2.0 | 2.0 | 1.4 | 2.0 | 2.0 | 1.7 | 0.5 |
| | 50° C. | % | 6.0 | 5.9 | 11.0 | 6.3 | 6.0 | 5.5 | 5.1 |
| | Maximum tensile stress | MPa | 0.55 | 0.42 | 0.29 | 0.47 | 0.73 | 0.38 | 0.32 |
| | Tensile breaking elongation | % | 155 | 202 | 171 | 100 | 230 | 184 | 201 |
| | Modulus of repulsion elasticity (falling ball test) | % | 60 | 65 | 68 | 49 | 60 | 61 | 65 |
| | Fusion bondability | — | good | good | good | good | excellent | good | good |
| | Contraction of expanded beads molded article | — | good | good | good | good | good | good | good |

| | Evaluation items | Unit | Example 8 | Example 9 | Comparative Example 1 | Comparative Example 2 | Comparative Example 3 | Comparative Example 4 | Comparative Example 5 |
|---|---|---|---|---|---|---|---|---|---|
| Particles of multi-block copolymer | Polymer | — | Polymer 2 | Polymer 1 | Polymer 3 | Polymer 4 | Polymer 5 | Polymer 1 | Polymer 1 |
| Crosslinked expanded particles | Apparent density | g/L | 94 | 92 | 125 | 148 | 170 | 101 | 91 |
| | Gel fraction | wt % | 54 | 36 | 45 | 41 | 53 | 67 | 19 |
| Expanded beads molded article | Apparent density | g/L | 66 | 67 | 82 | 99 | 146 | 78 | 62 |
| | 50% Compression stress | kPa | 93 | 106 | 100 | unmeasurable | unmeasurable | 125 | 83 |
| | Compression set 23° C. | % | 1.2 | 2.3 | 1.0 | unmeasurable | unmeasurable | 1.5 | 0.9 |
| | 50° C. | % | 12.7 | 8.4 | 8.3 | unmeasurable | unmeasurable | 4.5 | 11.7 |
| | Maximum tensile stress | MPa | 0.26 | 0.25 | 0.25 | 0 | 0.09 | 0.22 | 0.27 |
| | Tensile breaking elongation | % | 230 | 170 | 155 | 0 | 7 | 88 | 198 |
| | Modulus of repulsion elasticity (falling ball test) | % | 69 | 65 | 58 | unmeasurable | unmeasurable | 53 | 60 |
| | Fusion bondability | — | good | good | good | bad | bad | poor | good |
| | Contraction of expanded beads molded article | — | good | good | bad | bad | bad | bad | bad |

It was found from the evaluation results of Examples 1 to 9 that an expanded beads molded article excellent in in-mold moldability and excellent with good balance in lightweight property, flexibility, repulsion, restorability, and tensile characteristics could be produced by using particles of a multi-block copolymer containing a polyethylene block and an ethylene-α-olefin copolymer block having a melt flow rate of from 2 to 10 g/10 min at 190° C. and a load of 2.16 kg, and a Shore A hardness of from 65 to 90, and making crosslinked expanded beads produced through expansion of the particles to have a gel fraction of from 30 to 60% by a hot xylene extraction method.

On the other hand, in Comparative Example 1, since the melt flow rate of the particles of the multi-block copolymer was too large, the expanded beads molded article produced was considerably contracted, had a large compression set at 50° C., and had poor restorability.

In Comparative Example 2, since the melt flow rate of the particles of the multi-block copolymer was too small, the fusion bondability for molding an expanded beads molded article was inferior, making difficult to provide a favorable expanded beads molded article.

In Comparative Example 3, since the Shore A hardness of the particles of the multi-block copolymer was too small, In Comparative Example 4, since the gel fraction of the crosslinked expanded beads was too large, the expanded beads molded article produced in Comparative Example 4 was inferior in fusion bondability, and the maximum tensile stress and the tensile breaking elongation thereof were small.

In Comparative Example 5, since the gel fraction of the crosslinked expanded beads was too small, the expanded beads molded article was considerably contracted in in-mold molding, and had a large compression set at 50° C.

The invention claimed is:

1. Crosslinked expanded beads produced by crosslinking and expanding particles comprising a multi-block copolymer comprising a polyethylene block and an ethylene-α-olefin copolymer block, the multi-block copolymer having a melt flow rate of from 2 to 10 g/10 min at 190° C. and a load of 2.16 kg, a Shore A hardness of from 65 to 90 measured according to ASTM D2240, and a flexural modulus of from 10 to 30 MPa, the crosslinked expanded beads having a gel fraction of from 30 to 60% by a hot xylene extraction method, an apparent density of from 50 to 280 g/L, and an average particle diameter of from 0.5 to 10 mm.

2. An expanded beads molded article produced by subjecting the crosslinked expanded beads according to claim 1, to in-mold molding, having a tensile breaking elongation of 100% or more.

3. The expanded beads molded article according to claim 2, wherein the molded article has an apparent density of from 40 to 150 g/L.

* * * * *